US010299203B2

(12) United States Patent
Hessler et al.

(10) Patent No.: US 10,299,203 B2
(45) Date of Patent: May 21, 2019

(54) DYNAMIC MULTI-OPERATOR SPECTRUM ACTIVATION

(71) Applicant: Telefonaktiebolaget LM Ericsson (publ), Stockholm (SE)

(72) Inventors: Martin Hessler, Linköping (SE); Erik Eriksson, Linköping (SE); Pål Frenger, Linköping (SE); Göran Rune, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/521,323

(22) PCT Filed: Oct. 9, 2014

(86) PCT No.: PCT/SE2014/051191
§ 371 (c)(1),
(2) Date: Apr. 24, 2017

(87) PCT Pub. No.: WO2016/056964
PCT Pub. Date: Apr. 14, 2016

(65) Prior Publication Data
US 2017/0311255 A1    Oct. 26, 2017

(51) Int. Cl.
*H04W 4/00*     (2018.01)
*H04W 52/02*    (2009.01)
(Continued)

(52) U.S. Cl.
CPC ....... *H04W 52/0206* (2013.01); *H04W 16/14* (2013.01); *H04W 48/08* (2013.01);
(Continued)

(58) Field of Classification Search
CPC . H04W 52/0206; H04W 48/08; H04W 16/14; H04W 88/10
See application file for complete search history.

(56) References Cited

U.S. PATENT DOCUMENTS

2013/0295946 A1*  11/2013  Panchal ............... H04W 16/14
                                                 455/452.1
2014/0161002 A1*  6/2014  Gauvreau ............ H04W 16/24
                                                  370/280
(Continued)

FOREIGN PATENT DOCUMENTS

EP    1545144 A1    6/2005
EP    2434822 A1    3/2012

OTHER PUBLICATIONS

3rd Generation Partnership Project, "Technical Specification Group Services and System Aspects; Network Sharing; Architecture and functional description (Release 12)", 3GPP TS 23.251 V12.1.0, Jun. 2014, pp. 1-35.

*Primary Examiner* — Clemence S Han
(74) *Attorney, Agent, or Firm* — Patent Portfolio Builders, PLLC

(57) ABSTRACT

According to an aspect of the teachings herein, dynamic cell activation uses the spectrum of a spectrum owner to provide wireless communication services in a location that may not be served by the spectrum owner. For example, a base station determines which one of two or more network operators is targeted by a wireless device requesting access, and correspondingly activates communication services for the device, using spectrum owned by the targeted network operator. Advantageously, the cell(s) may not be persistent and instead may be provided only when access is requested and then only in the spectrum of the targeted network operator(s). This approach offers power savings as compared to providing persistent cells for multiple network operators. Further, the contemplated arrangement makes it economic for third parties and network operators to use of operator-owned spectrum that might otherwise remain unexploited in the involved locations.

24 Claims, 5 Drawing Sheets

(51) Int. Cl.
*H04W 48/18* (2009.01)
*H04W 16/14* (2009.01)
*H04W 48/08* (2009.01)
H04W 48/10 (2009.01)
H04W 48/12 (2009.01)
H04W 48/16 (2009.01)
H04W 88/10 (2009.01)

(52) U.S. Cl.
CPC ............ *H04W 48/18* (2013.01); *H04W 48/10* (2013.01); *H04W 48/12* (2013.01); *H04W 48/16* (2013.01); *H04W 88/10* (2013.01); *Y02D 70/00* (2018.01); *Y02D 70/1224* (2018.01); *Y02D 70/1244* (2018.01); *Y02D 70/1262* (2018.01); *Y02D 70/142* (2018.01); *Y02D 70/21* (2018.01)

(56) References Cited

U.S. PATENT DOCUMENTS

2015/0264592 A1* 9/2015 Novlan ............... H04L 27/2601
                                                        370/252
2015/0304853 A1* 10/2015 Murray ................. H04W 16/14
                                                        455/454
2017/0135074 A1* 5/2017 Yi ........................ H04W 72/042

* cited by examiner

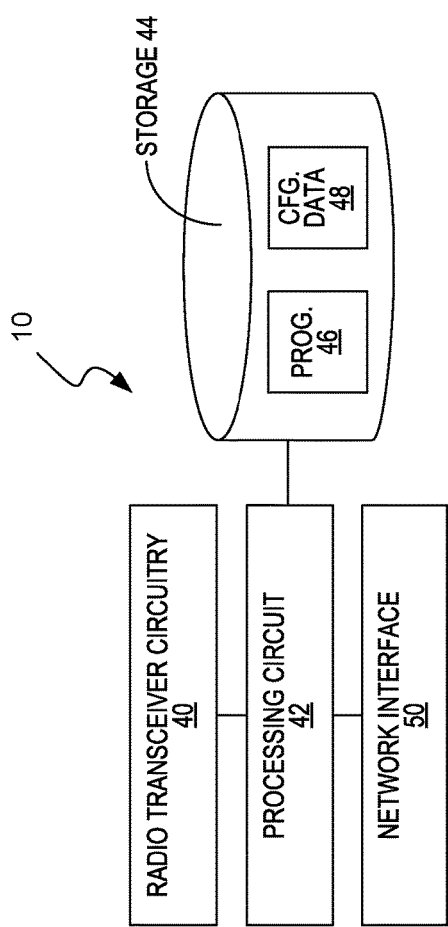
FIG. 2
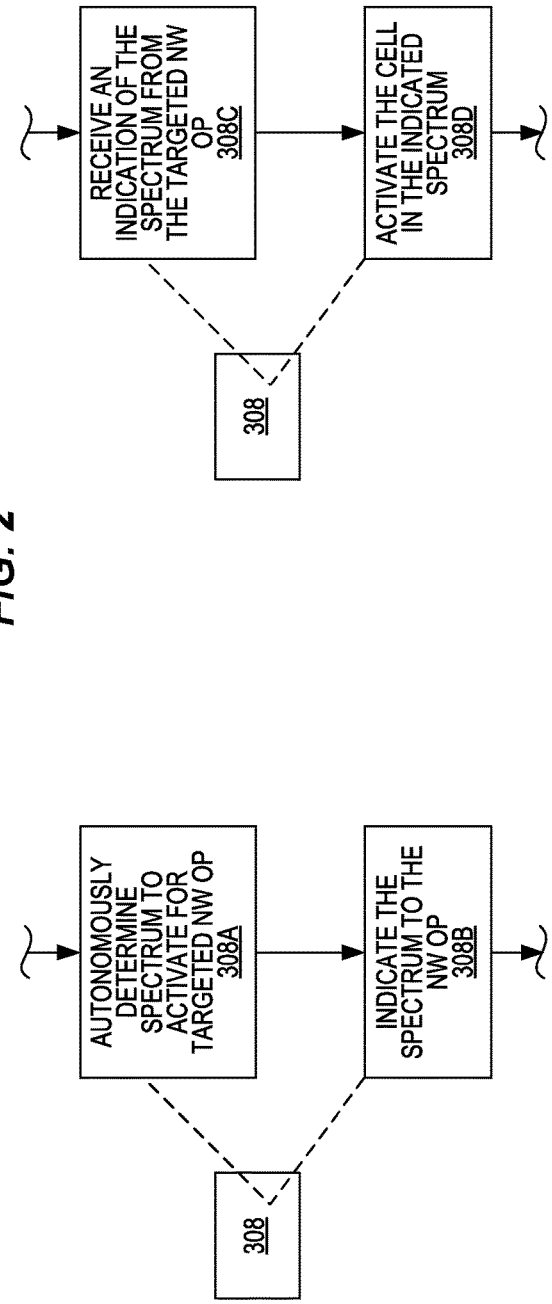
FIG. 7
FIG. 6

DYNAMIC MULTI-OPERATOR SPECTRUM ACTIVATION

TECHNICAL FIELD

The present invention relates to wireless communication networks, and particularly relates to dynamic cell activation using selected spectrum.

BACKGROUND

In recent years, rising and volatile energy prices have had a profound effect on all industries, not least the telecommunications sector, which is now also challenged by rapidly rising traffic volumes and massive subscriber uptake. Energy concerns coupled with the fact that telecom operators are among the largest electricity consumers in many countries are adding to the importance of improved energy performance in the radio network.

Spectrum represents one of the most important resources in wireless radio technology. For example, substantial benefits flow when different regions use the same frequency bands for the same purpose. Often in each country the different frequency bands are sold in so called "spectrum auctions", meaning that the auctioned spectrum goes to the highest bidders. These high bidders do not necessarily make full use of the acquired spectrum. For example, radar and military applications seldom use all of the spectrum allocated to those applications. Even telecommunication operators often do not use all of their allocated spectrum, e.g., because of selective deployment of certain radio access technologies, such as those associated with higher-data rate services.

In the future networked society, more and more of everyday life will be dependent upon the availability of high-capacity wireless technology. This inevitability implies that more and more business opportunities will arise from the deployment of wireless technology. However, it is recognized herein that many of these diverse business cases will not be lucrative enough to permit or justify the purchase of required spectrum. Consider, for example, the emerging machine type communication, MTC, markets in which potentially large numbers of devices need to communicate. These devices may be situated in remote locations, e.g., in industrial areas with few humans, and will typically use Public Land Mobile Networks, PLMN, for accessing the corresponding MTC service provider networks and systems.

Although the availability of wireless networks using standardized spectrum and radio access technologies adds meaningful value, e.g., such as promoting tourism and business development, the capital expenditures needed to build out such systems far exceed, at least initially, the revenue available from an initially small subscriber base. Such areas thus may be underserved because the spectrum owners lack the threshold level of economic incentive to make the initial build-out investments.

As another example, consider the case where large groups of people congregate, such as at concerts, sporting events, etc. The venue owners may not be interested in partnering with any specific communications network operator. Further, the congregated people will generally represent a diverse set of network operator affiliations, and it is very difficult to install operator-specific equipment for all or even most of the represented operators. Further, the energy usage is undesirably high for multi-operator base stations that persistently operate with multiple carriers over a range of frequency spectrums or bands associated with the different operators.

While these issues might suggest an opportunity for the venue owner or another third party to provide communication services at least within the confines of the involved premises, it is recognized herein that a primary obstacle to doing so is the lack of available licensed spectrum. For example, while the use of WiFi networks over limited coverage areas is a well-known approach, that approach lacks the capacity, flexibility and other advantages that flow from the use of 3 GPP or other standardized wide-area network spectrum.

SUMMARY

According to an aspect of the teachings herein, dynamic cell activation uses the spectrum of a spectrum owner to provide wireless communication services in a location that may not be served by the spectrum owner. For example, a base station determines which one of two or more network operators is targeted by a wireless device requesting access, and correspondingly activates communication services for the device, using spectrum owned by the targeted network operator. Advantageously, the dynamically activated cell(s) are not required to be persistent and instead may be provided only when access is requested and then only in the spectrum of the targeted network operator(s). This approach offers power savings as compared to providing persistent cells for multiple network operators. Further, the contemplated arrangement makes it economic for third parties and network operators to use operator-owned spectrum that might otherwise remain unexploited in the involved locations.

In an example embodiment, a method at a base station is directed to dynamic cell activation. The method includes transmitting an indication of two or more network operators on an announcement channel, receiving an access request on an access channel associated with the announcement channel, said access request sent from a wireless device in response to receiving the announcement channel, and determining a targeted one of the network operators from the access request. The method further includes activating a cell in a selected spectrum that is associated with the targeted network operator, for providing communication services to the wireless device via the cell. Note that the activated cell may belong to the base station, or may belong to another base station. In an example of this latter case, the base station activates the cell by sending signaling to the other base station.

In a corresponding apparatus example, a base station or an associated network node is configured to perform dynamic cell activation. The example base station includes radio transceiver circuitry configured for communicating with wireless devices, and a processing circuit that is operatively associated with the radio transceiver circuitry. The processing circuit is configured to transmit, via the radio transceiver circuitry, an indication of two or more network operators on an announcement channel, and to receive, via the radio transceiver circuitry, an access request on an access channel associated with the announcement channel. Here, it will be understood that the wireless device sends the access request in response to receiving the announcement channel. The processing circuit is further configured to determine a targeted one of the network operators from the access request, and to activate a cell in a selected spectrum that is associated with the targeted network operator, for providing communication services to the wireless device via the cell.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 is a block diagram of one embodiment of an example base station configured for dynamic cell activation.

FIG. 3 is a logic flow diagram of one embodiment of a method of processing at a base station or at an associated network node, for carrying out dynamic cell activation.

FIGS. 4-8 are logic flow diagrams providing example details for various ones of the operations depicted in the method of FIG. 3.

DETAILED DESCRIPTION

Figure 1:
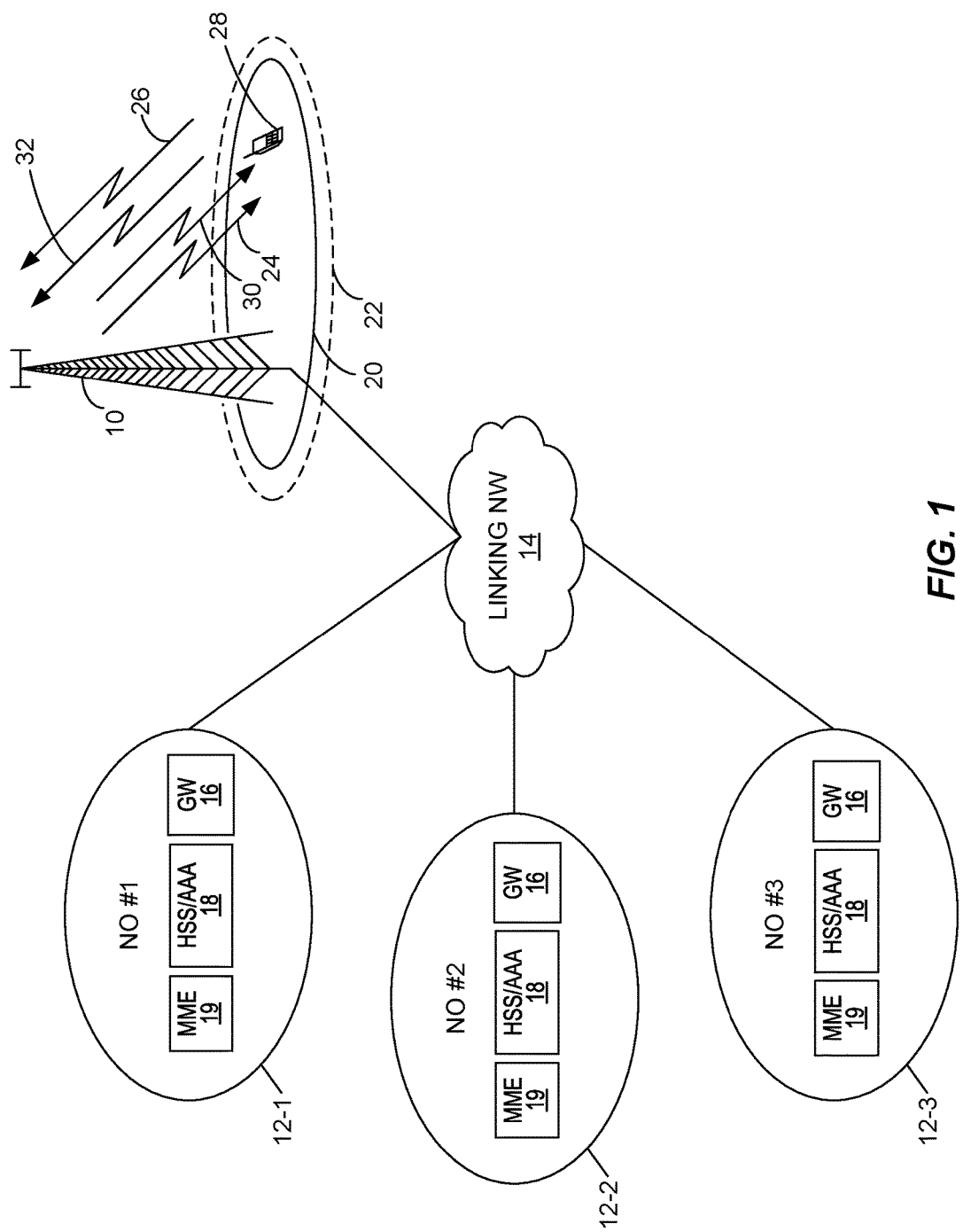
FIG. 1 is a block diagram of one embodiment of a base station configured for dynamic cell activation, shown in context with a number of wireless communication networks corresponding to a number of network operators.

FIG. 1 illustrates a base station 10 that is communicatively linked to a number of wireless communication network operators 12. In the diagram, each operator 12 is represented by a corresponding network and the reference number "12" is used herein to refer to a given operator and/or the communication network corresponding to that operator. Suffixes, e.g., −1, −2 and −3 are used only when needed to distinguish between specific operators and/or operator networks.

The base station 10 links to two or more network operators 12 through a linking network 14, which includes public or closed IP networks, for example. For example, the base station 10 links to one or more Core Network, CN, entities that are associated with the respective network operators 12. By way of example, each network operator 12 is associated with a Gateway entity, GW, 16, and an HSS/AAA entity 18. Here, "HSS" denotes Home Subscriber Server and "AAA" denotes Authentication/Authorization/Accounting functionality. These operator networks generally also include one or more mobility management entities, MMEs, 19.

Of course, the specific terminology of these packet-routing and authorization nodes will vary according to the network standards applicable to the involved operator networks. The details of these example entities is relevant to this discussion only to the extent that such entities may be involved in the permission-based activation of certain spectrum in one or more embodiments contemplated herein.

The base station 10 is configured to perform dynamic cell activation using the spectrum of a spectrum owner, to provide wireless communication services in the selected spectrum. The diagram depicts a first cell 20 and a second cell 22, which are associated with the base station 10. The first cell 20 is defined by the transmission of a downlink announcement channel from the base station 10, e.g., on a downlink announcement carrier 24, and the transmission of corresponding access requests on an associated access channel, e.g., on an uplink access carrier 26. Such requests are sent by given wireless devices 28 in response to receiving the aforementioned signaling on the announcement channel.

Thus, the "cell" 20 may be a persistent but possibly simplified and low-power cell defined by the coverage area and radio resources of the announcement-channel signaling and corresponding access-channel signaling. By way of non-limiting example, the cell 20 may have any one or more of the following simplifications: an omnidirectional coverage area, a single transmit antenna, and a narrow bandwidth. The cell 22 is used to provide cellular communication services on an on-demand or as-needed basis, and, in at least some embodiments, the cell 22 may have any one or more of the following: a high gain directional antenna, multiple transmit and receive antennas or antenna elements, and a large bandwidth. Further, the base station 10 may have more than one access point to choose from for use in activating the cell 22, and not all of those access points may be used or available for providing the cell 20.

However implemented, the cell 22 is dynamically activated by the base station 10 requesting access to cellular communication services from the base station 10, using selected spectrum that belongs to or is affiliated with the network operator 12 targeted by that request. Here, it will be understood that each network operator 12 may own different spectrum and the different network operators 12 also may be associated with different types of networks, e.g., different Radio Access Technologies or RATs.

The downlink and uplink carriers 30 and 32 used in the dynamically-activated cell are implemented within the selected spectrum and preferably are implemented according to the applicable radio access technology specifications, e.g., according to the same technical specifications used by the operator network 12 associated with the selected spectrum. By way of example, the cell 22 and its associated downlink and uplink carriers 30 and 32 may be Long Term Evolution, LTE, or Wideband CDMA, WCDMA, carriers implemented according to the relevant technical specifications promulgated by the Third Generation Partnership Project.

FIG. 2 depicts example implementation details for the base station 10. As explained, the base station 10 is configured to perform dynamic cell activation in a selected spectrum and it includes radio transceiver circuitry 40, a processing circuit 42, and storage 44. In an example embodiment, the storage 44 stores a computer program 46 and configuration data 48. The storage 44 provides non-transitory storage for the computer program 46 and it may comprise disk storage, solid-state memory storage, or any mix thereof. By way of non-limiting example, the storage 44 comprises any one or more of SRAM, DRAM, EEPROM, and FLASH memory.

The example base station 10 further includes a network interface 50, which is configured for communicating with the respective network operators 12. The radio transceiver circuitry 40 is configured for communicating with wireless devices 28, e.g., for transmitting announcement signaling on the announcement channel and receiving access requests on the access channel, and for sending and receiving transmissions on the downlink and uplink carriers 30 and 32 used in the dynamically activated cell 22.

The processing circuit 42 is operatively associated with the radio transceiver circuitry 40 and is configured to transmit, via the radio transceiver circuitry 40, an indication of two or more network operators on the announcement channel 24. The indication may be explicit or implicit, e.g., an appropriately configured wireless device 12 may recognize the nature of the announcement channel from its structure, timing, etc. On the other hand, the announcement channel may be transmitted as a conventional cellular network overhead channel of the type that the wireless devices 12 are already configured to search for and receive, or some simplified implementation of such a channel, and may carry an explicit indication of the availability of communication services from two or more network operators.

Broadly, the processing circuit 42 is configured to transmit, via the radio transceiver circuitry 40, an indication of two or more network operators on the announcement channel, and to receive, also via the radio transceiver circuitry 40, an access request on the access channel. The access request is sent from a given wireless device 28 in response to that device 28 receiving the announcement channel 24. Of course, there may be any number of wireless devices 28 at a given time that are within reception range of the announcement channel 24, and it should be understood that FIG. 2 and this discussion focus on a single device merely for ease of discussion.

The base station 10 may perform the disclosed dynamic cell activation with respect to multiple wireless devices 28. For example, consider the case where a first wireless device 28 sends an access request targeting a first network operator 12, and a second wireless device 28 sends an access request targeting a second network operator 12. In response, the base station 10 may activate a first cell 22 using first spectrum of the first targeted network operator 12, and it may activate a second cell 22 using second spectrum of the second targeted network operator 12. The base station 10 in one or more embodiments is further configured to admit additional wireless devices 28 into an existing dynamically activated cell 22, such as where the cell 22 was dynamically activated for a first wireless device 28 and is still active when a second wireless device 28 sends an access request targeting the same network operator 12.

Moreover, there may be more than one such base station 10, e.g., two or more base stations 10 that are communicatively coupled together through sidehaul links, over-the-air links, or other coupling mechanisms. Each such base station 10 may independently perform dynamic cell activation as taught herein and/or may cooperate in performing dynamic cell activation.

In any case, for a given access request from a given wireless device 28, the processing circuit 42 is configured to determine a targeted one of the network operators 12 from the access request, and activate a cell 22 in a selected spectrum which is associated with the targeted network operator 12. The base station 10 uses the selected spectrum for providing communication services to the wireless device 28 in the cell 22. For example, assume there are three network operators 12 identified on the announcement channel and an access request from a given wireless device 28 identifies a particular one of them. The processing circuit 42 is configured to respond to the access request by selecting the spectrum that is known by the processing circuit 42 to be associated to the identified network operator 12, and to activate a cell 22 in the selected spectrum. It will be understood that such activation comports with the applicable RAT.

The RAT used in the cell 22 will, in at least some embodiments, be the same as that used by the network operator 12. In some instances, for example, the cell 22 may be operated as a standard WCDMA cell, with or without HSDPA, and in other instances it may be operated as a standard LTE cell, and in other instances it may be operated as a standard GSM/GPRS cell. This flexibility of course requires the base station 10 to have radio frequency transceiver circuitry that is configured for the different frequency bands and air interface requirements.

Turning to additional example details for implementation, the processor circuit 42 in at least some embodiments is configured to transmit the downlink announcement carrier 24 and to receive the uplink access carrier 26 according to air interface protocols predefined for one or more types of wireless communication networks associated with the network operators 12. For example, the downlink announcement carrier 24 is structured like that used in LTE for transmission of the Physical Broadcast Channel, while the uplink access carrier 26 supports LTE random access procedures, i.e., a wireless device 28 transmits the access request as a Random Access Channel, RACH, transmission.

Indeed, for compatibility with a wide range of wireless devices 28, the downlink announcement carrier 24 may, in fact, be multiple carriers transmitted in the frequency bands characteristic of the various network operators 12, according to the RATs used by those various network operators 12. Correspondingly, in such embodiments, the base station 10 is configured to monitor for access requests in each of the frequency bands in use for the announcement channel, according to the air interface particulars applicable to each such frequency. In other embodiments, the base station 10 uses a single defined frequency and air interface protocols for 22), admitting the wireless device (28 and the various wireless devices 28 are appropriately configured for compatibility.

As for determining which network operator 12 is targeted by a given received access request, in an example configuration, the processing circuit 42 indicates the availability of two or more network operators 12 on the announcement channel by transmitting network operator identifiers corresponding to the two or more network operators 12. This transmission of operator-specific identifiers allows the processing circuit 42 to determine the targeted network operator 12 based on which one or ones of the transmitted network identifiers are included in the access request sent from the wireless device 28. Alternatively, regardless of whether or not the base station 10 transmits explicit identifiers for the available network operators 12, the processing circuit 42 is configured to determine the network operator 12 targeted by a given access request by deriving the identity of the targeted network operator 12 from the identity of the wireless device 28, as included by the wireless device 28 in the access request.

In a non-limiting example of this latter approach, the wireless device 28 includes its International Mobile Subscriber Identity, IMSI, or another at least temporarily unique identifier that is associated with the wireless device 28, in the access request. The base station 10 generates a query, either for each network operator 12, or for a centralized data server, where that query includes the identifier received from the device 28, or an identifier derived therefrom. In cases where the query is sent to each network operator 12, the base station 10 receives return replies from each network operator 12, e.g., indicating whether or not the wireless device 28 is affiliated with the network operator 12. To the extent that only one network operator 12 indicates affiliation with the wireless device 12, that network operator 12 will be taken as the targeted network operator 12. If two or more network operators 12 indicate some level of affiliation, e.g., because of roaming or other business agreements between network operators 12, the base station 10 may compare preference or priority information returned to it from the operator networks 12, or otherwise known to it, to decide which network operator 12 should be targeted.

In at least some embodiments, the processing circuit 42 is configured to transmit the indication of the two or more network operators 12 on the announcement channel, based on transmitting a common network operator identifier for the two or more network operators 12. Here, the wireless devices 28 are configured to recognize that common network operator as being indicative of the availability of more than one network operator 12. The wireless devices 28 may therefore return the identity of their preferred network operator 12 in their return access requests, or they may return their device identifiers and rely on the base station 10 to determine the appropriate network operator affiliations from those device identifiers.

Dynamic cell activation may be conditioned on any number of requirements. For example, in some embodiments, the processing circuit 42 is configured to conditionally activate a cell 22 for a given wireless device 28 in dependence on communicating, via the network interface 50, with a network entity that is associated with the targeted network operator 12, or associated with a roaming partner of the targeted network operator 12, and receiving a return authorization from the network entity that indicates that cell activation is authorized for the wireless device 28. In an example case, the network entity in question is a HSS/AAA 18, as depicted in FIG. 1. However, the network operators 12 may install or at least logically configure another type of server that is specifically dedicated to receiving access queries from the base station 10, or at least to operate as an intermediary between the base station 10 and the HSS/AAA 18.

In the same or other embodiments, the processing circuit 42 is configured to, subsequent to activation of a cell 22, admit a wireless device 28 into the cell 22, based on recognizing the wireless device 28 as having initially accessed the base station 10 via the access channel. For example, the base station 10 dynamically activates the cell 22 and relies on the fact that the wireless device 28 will detect the newly activated cell by virtue of whatever normal cell searching and detection processes normally run in the wireless device 28. From the wireless device's perspective, the newly activated cell 22 looks "normal" and it undertakes a conventional random access procedure towards the cell 22. However, the base station 10 may operate the cell 22 such that admissions are closed except to the wireless device 28 for which the cell 22 was activated. Thus, the base station 10 would admit the wireless device 28 into the cell 22, based on its device identifier or value that allows the base station 10 to recognize that the wireless device 28 is the same device for which the cell activation was undertaken.

It is also contemplated herein that the base station 10 operates with an admissions control policy wherein, once a cell 22 is dynamically activated for any given wireless device 28, then additional wireless devices 28 are admitted into that same cell 22, so long as each such additional wireless device 28 first sends an access request on the access channel and is identified as being affiliated with the same network operator 12 in whose spectrum the cell 22 was activated. This approach allows the base station 10 to maintain a given cell 22 for so long as there are any authorized wireless devices 28 using communication services in the cell 22. Of course, the base station 10 may also apply normal admissions control procedures to the cell 22, e.g., to prevent overloading and/or ensure required qualities of service, etc. Thus, in at least some embodiments, the processing circuit 42 is configured to disallow admission of any additional wireless devices 28 to a cell 22 after activation of the cell 22, unless such additional wireless devices 28 first request access to communication services via the access channel and are determined by the base station 10 to be affiliated with the same targeted network operator 12 for which the cell 22 was activated.

Further, as noted, in one or more embodiments, the processing circuit 42 is configured for the operation of activating the cell 22 in question, based on activating a radio communication cell 22 at the base station 10, or initiating such activation by another base station 10. In either case, the cell activation may be in accordance with predefined air interface and network signaling protocols, as are used by the targeted network operator 12, for operating an affiliated cellular communication network in the selected spectrum. Notably, the processing circuit 42 in at least some embodiments is configured to select the particular spectrum in which to activate the cell 22 autonomously, and send, via the network interface 50, an indication to the targeted network operator 12 of the activation. For example, the targeted network operator 12 may provide communication services in several different frequency bands and the base station 10 may autonomously select the particular frequency band to use for cell activation and report that selection to the network operator 12.

In an alternative processing implementation, the processing circuit 42 is configured to receive, via the network interface 50, an indication from the targeted network operator 12 that indicates the particular spectrum in which to activate the cell 22, and to correspondingly activate the cell 22 in the indicated spectrum. Of course, the processing circuit 42 may use both approaches, e.g., one or more network operators 12 may permit autonomous spectrum selection by the base station 10, while one or more others do not, or there may be times when the base station 10 autonomously selects the particular spectrum and other times when it relies on the targeted network operator 12 to indicate its preferences for the particular spectrum used for dynamic cell activation.

With the above processing configurations in mind, FIG. 3 illustrates an example method 300 at a base station 10, which method is directed to dynamic cell activation. The base station 10, for example, is configured to carry out the processing of the method 300, or variations thereof, based on its execution of stored program instructions included in the computer program 46 shown in FIG. 2. In such embodiments, the processing circuit 42 comprises digital processing circuitry that is programmatically configured based on its execution of the stored computer program instructions. Non-limiting examples of such circuitry include one or more microprocessors, Digital Signal Processors, DSPs, Application Specific Integrated Circuits, ASICs, and Field Programmable Gate Arrays, FPGAs. In general, the processing circuit 42 may comprise any one or more processing circuits comprising fixed circuitry, programmed circuitry, or some combination thereof.

The method 300 includes the base station 10 transmitting (Block 302) an indication of two or more network operators 12 on an announcement channel, and receiving (Block 304) an access request on an access channel associated with the announcement channel. As before, the access request is sent from a wireless device 28 in response to receiving the announcement channel—i.e., in response to receiving signaling sent from the base station 10 over the announcement channel. The method 300 further includes determining (Block 306) a targeted one of the network operators 12 from the access request, and activating (Block 308) a cell 22 in a selected spectrum that is associated with the targeted network operator 12, for providing communication services to the wireless device 28 via the cell 22. In some embodiments, more than one carrier is dynamically activated for providing carrier aggregation, CA, based service to the wireless device 28. Thus, while not explicitly shown, it will be understood that dynamic cell activation may involve activating more than one cell 22, e.g., dynamic activation of two cells, which could be denoted as cell 22a and cell 22b, where cells 22a and 22b correspond to different carrier frequencies. The two dynamically activated cells may have partially or fully overlapping coverage areas.

FIG. 4 illustrates that the processing operations of Block 306 may comprise the base station 10 receiving an identifier of the targeted network operator 12 in the access request transmitted from the wireless device 28 and determining the targeted network operator 12 from that identifier (Blocks 306A and 306B). For example, the base station 10 has access to a mapping table or other data structure that maps network operator identifiers to network addresses or other point-of-contact information for the respective network operators 12.

FIG. 5 illustrates that the processing operations of Block 306 may comprise the base station 10 receiving an identifier of the wireless device 28 in the access request transmitted from the wireless device 28 and determining the targeted network operator 12 from that identifier (Blocks 306C and 306D). For example, the base station 10 has access to a mapping table or other data structure that maps device identifiers to respective network operators 12. Alternatively, the base station 10 may effectively "page" the network operators 12, by submitting the device identifier to the network operators 12, and receive return indications from each network operator 12, indicating whether or not the network operator 12 recognizes the device identifier.

Figure 7:
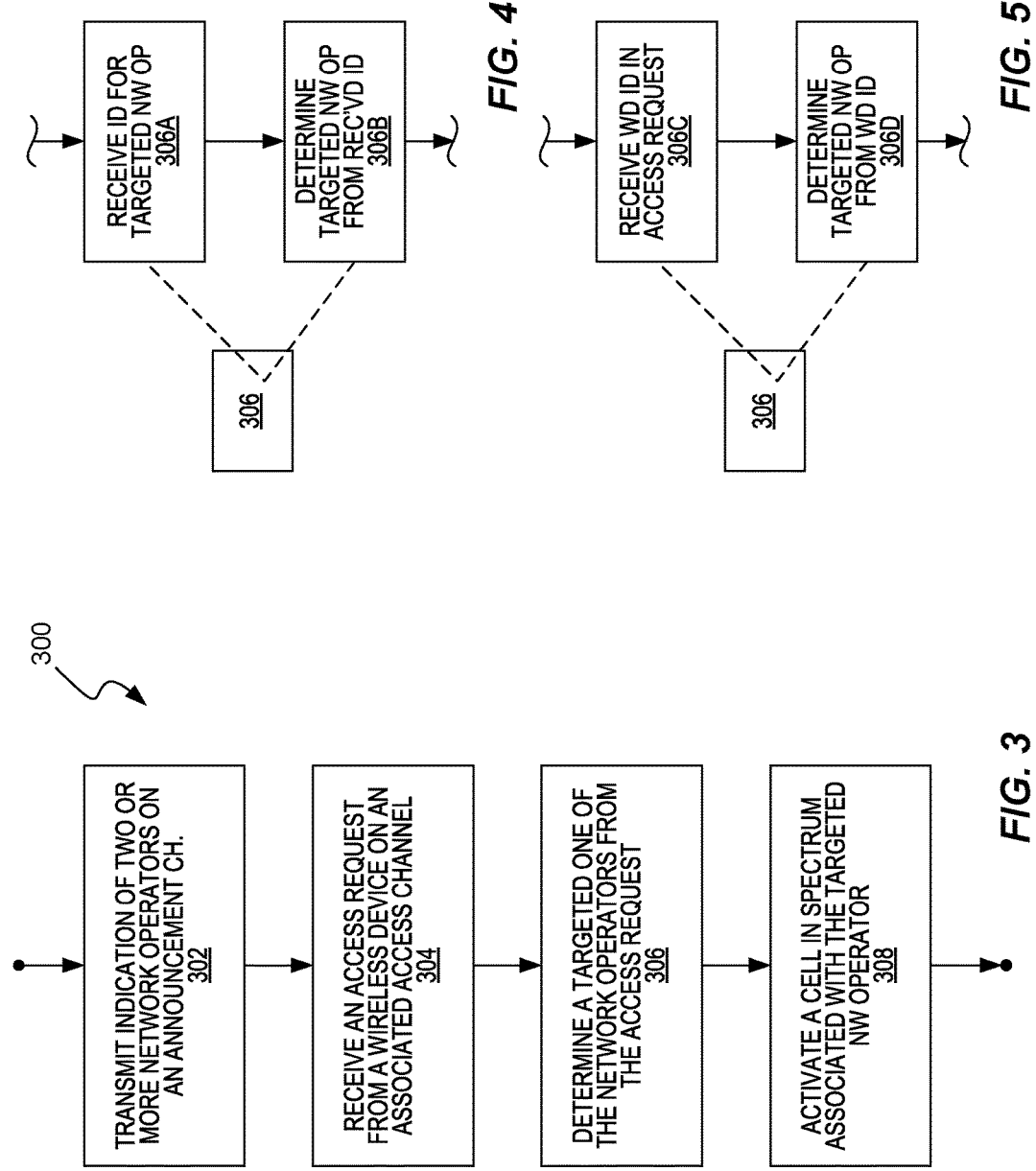

FIG. 6 illustrates that the processing operations of Block 308 may comprise the base station 10 autonomously determining the spectrum in which to activate the cell 22, for any given targeted network operator, and to indicate that spectrum selection decision to the targeted network operator 12 (Blocks 308A and 308B). FIG. 7 illustrates an alternative approach, where the processing operations of Block 308 comprise the base station 10 receiving from the targeted network operator 12 an indication of the particular spectrum in which to activate the cell 22, and to activate the cell 22 in the indicated spectrum (Blocks 308C and 308D).

Figure 8:
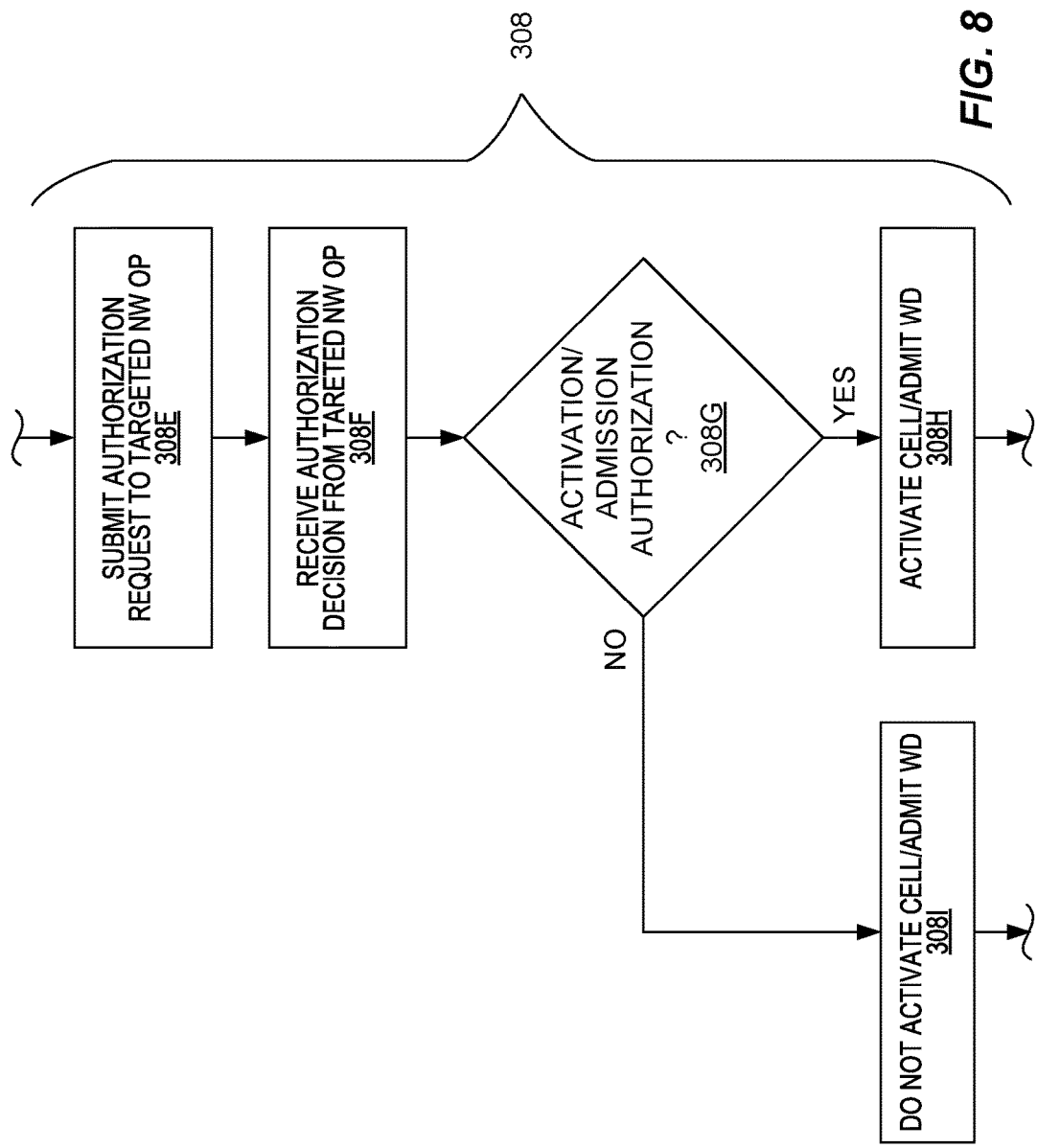

FIG. 8 illustrates additional example implementation details for the processing of Block 308 according to one or more embodiments. In Block 308E, the processing circuit 42 submits an authorization request to the targeted network operator 12, and receives (Block 308F) an authorization decision from the targeted network operator 12. In other words, for a given wireless device 28 from which the base station 10 received an access request, the base station 10 asks the network operator 12 targeted by that request to indicate whether access by the wireless device 28 is authorized.

If the authorization decision indicates that access is authorized (YES from Block 308G), processing continues with activation of the cell 22 and admission of the wireless device 28 into the cell 22 (Block 308H). On the other hand, if the authorization decision indicates that access is not authorized (NO from Block 308G), the base station 10 does not activate the cell 22 and/or does not admit the wireless device 28 into the cell 22.

Consider a further example in which the announcement channel is transmitted using a 3GPP technology, e.g., where the announcement carrier 24 is a 1.4 MHz Time Division Duplex, TDD, carrier or a GSM carrier. The announcement channel carriers transmit signaling indicating the PLMN IDs of the available network operators 12, or a common PLMN ID used for some or all such operators. Once a wireless device 28 enters the coverage area of the announcement channel—i.e., the cell 20—and once the base station 10 verifies spectrum usage permission for the wireless device 28, the base station 10 may activate the cell 22 in the spectrum owned by the targeted network operator 12.

In other embodiments, the right to use spectrum is pre-arranged, e.g., there is an agreement between owner of the base station 10 and the relevant network operators 12, resulting in pre-arranged network configuration to use the spectrum provided by the operators. In such embodiments, the base station 10 autonomously activates the spectrum of a targeted network operator 12. The base station 10 may use the identity of a given wireless device 28 to identify the network operator 12 to be targeted for spectrum activation in response to receiving an access request from the wireless device 28. Of course, as noted, the spectrum activation decision can also be made by the involved network operator 12, based on the base station 10 requesting authorization from the network operator 12.

In such embodiments, the signaling from the network operator 12 is explicit, e.g., an activation message sent from a node associated with the network operator 12. In other embodiments, such signaling is done using an operations and maintenance interface. In a specific embodiment related to Evolved Universal Terrestrial Radio Access Network, EUTRAN, implementations of the base station 10 and Evolved Packet Core, EPC, implementations of the operator core networks, there may be an "S1" interface between the base station 10 and one or more of the network operators 12. Alternatively, or additionally, such signaling may come on an "X2" or other inter-base station interface, such as where one base station 10 initiates or controls cell activation by another base station 10. In any case, a given network operator 12 may decide to activate additional licensed spectrum for all users supporting the spectrum or based on other criteria. In some embodiments, spectrum is only activated based on specific subscription information, e.g., for premium customers or subscribers having an association with the owner/operator of the base station 10. Conditional activation of the cell 22 for a given wireless device 12 may also depend on the type or number of services the wireless device 28 is running.

Broadly, a base station 10 configured according to at least some of the embodiments detailed herein uses a first carrier for announcing the identities of at least two network operators 12 for which additional spectrum associated with each operator can be made available—i.e., the downlink announcement carrier 24 and the uplink access carrier 26. For a given wireless device 28 that has requested access, the base station 10 activates a second carrier—i.e., the combination of the downlink and uplink carriers 30 and 32 shown in FIG. 1—to provide communication services to the wireless device 28 in selected spectrum corresponding to the network operator 12 targeted by the access request. The base station 10 and the corresponding method thus provide a spectrum and network sharing solution that does not depend on any single universal coordination functionality. The solution enables a third-party deployed base station to use licensed spectrum that is owned or controlled by the network operators, and allows those operators to exploit their spectrum allocations in locations that are not necessarily served by the network operators.

Figure 9:
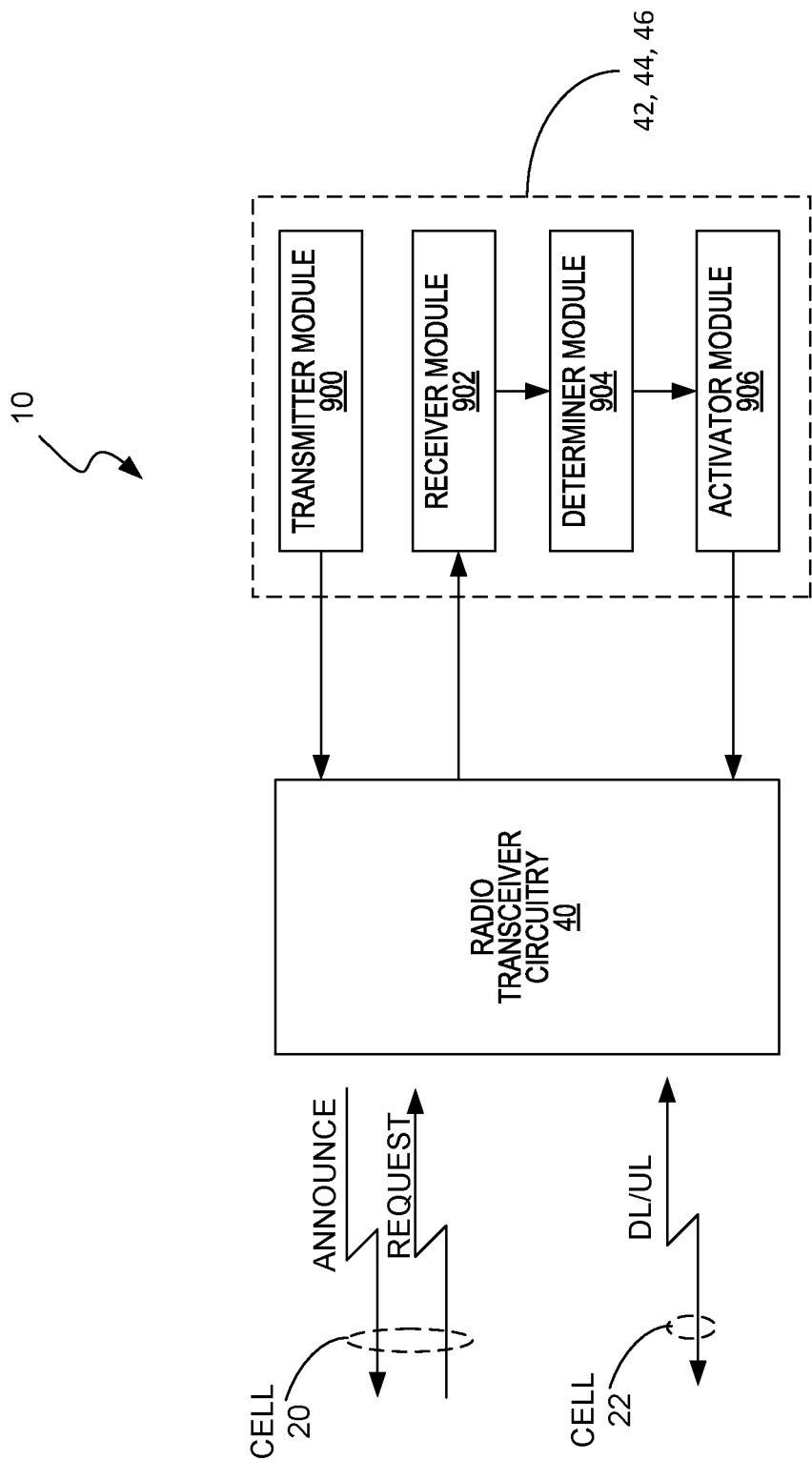
FIG. 9 is a block diagram of one embodiment of a functional architecture implemented in a base station, for carrying out dynamic cell activation.

FIG. 9 illustrates another example embodiment of a base station 10 that is configured for dynamic cell activation as taught herein. Here, the base station 10 comprises a number of functional modules, including a transmitter module 900 configured to transmit an indication of two or more network operators 12 on an announcement channel, and a receiver module 902 that is configured to receive an access request on an access channel associated with the announcement channel, wherein the access request sent from a wireless device 28 in response to receiving the announcement channel. It will be appreciated that the downlink carrier 24 and uplink carrier 26, as shown in FIG. 1, may carry the announcement and request signaling, respectively, and that these carriers 24 and 26 may be regarded as comprising a cell 20 that is used for purposes of announcing the dynamic availability of spectrum from two or more network operators 12.

The base station 10 further includes a determiner module 904 that is configured to determine a targeted one of the network operators 12 from the access request, as received from the wireless device 28, and an activator module 906. The activator module 906 is configured to activate a cell 22 in spectrum associated with the targeted network operator 12, as the selected spectrum, for providing communication services to the wireless device 28 via the cell 22. It will be appreciated that the cell 22 can be understood as being defined by the activation of transmit and receive radio transceiver circuitry 40 at a frequency or frequencies defined by the selected spectrum, such that the base station 10 and the wireless device 28 communicate on downlink, DL, and uplink, UL, carriers within the selected spectrum according to the signal structure and protocols defined by the associated RAT.

Use of the announcement channel for dynamic, as-needed cell activation, therefore enables the deployment of highly energy efficient networks because, instead of transmitting several carriers related to different network operators 12, the proposed solution uses an announcement carrier to indicate to wireless devices 28 the availability of spectrum from two or more network operators 12 and enables activation of operator-specific spectrum and carriers only when requested. The announcement carrier 24 shown in FIG. 1 for announcement channel signaling may be transmitted in an unlicensed spectrum, such as a WiFi hotspot transmission, or may be transmitted in licensed spectrum, e.g., a small portion of licensed spectrum may be reserved for such announcement channel transmissions.

In a further notable aspect of the teachings herein, network operators 12 can in some sense issue "spectrum certificates" that advantageously exploit or extend conventional handover procedures in which mobile wireless devices 28 are handed over between network base stations, even across RATs and across network operators 12. For example, assume that a base station 10 of the type described herein is installed at a sports stadium or other location in which large crowds congregate. A given subscriber of a given network operator 12 may initially begin operating their wireless device 28 within the network coverage area of their respective network operator 12. As that subscriber enters the stadium or other location at issue, the wireless device 28 can be handed over to the base station 10, by virtue of the base station 10 dynamically activating a cell 22 in the spectrum of the involved network operator 12 and admitting the wireless device 22 into the cell 22. Of course, once the cell 22 is activated, subsequent wireless devices 28 may be admitted to the cell 22 provided those wireless devices 28 are associated with subscribers of the same network operator 12. Such approaches advantageously permit "roaming like behavior and the use of essentially conventional charging solutions in the context of dynamic cell activation In one example implementation, the mobility management entities, e.g., the MMES 19 shown in FIG. 1, of the network operators 12 are configured to track the movement of subscriber wireless devices 28 into service coverage areas associated with dynamic cell activation, and to communicate with the base station(s) 10 in those locations, e.g., to provide seamless handover of a given wireless device 28 from the operator network to a dynamically-activated cell 22.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, at a base station, of performing dynamic cell activation, the method comprising:
   transmitting an indication of two or more network operators on an announcement channel;
   receiving an access request on an access channel associated with the announcement channel, wherein the access request is sent from a wireless device in response to receiving the announcement channel;
   determining a targeted network operator of the two or more network operators from the access request; and
   activating a cell in a selected spectrum that is associated with the targeted network operator, for providing communication services to the wireless device via the cell,
   wherein the activating the cell comprises activating a radio communication cell at the base station, or initiating such activation at another base station, in accordance with predefined air interface protocols and network signaling protocols, as are used by the targeted network operator for operating an affiliated cellular communication network in the selected spectrum.

2. The method of claim 1:
   wherein the transmitting the indication comprises transmitting signaling on a downlink announcement carrier; and
   wherein the receiving the access request comprises receiving signaling on a corresponding uplink access carrier.

3. The method of claim 2, further comprising transmitting the downlink announcement carrier and receiving the uplink access carrier according to air interface protocols predefined for one or more types of wireless communication networks associated with the two or more network operators.

4. The method of claim 1, wherein the determining the targeted network operator of the two or more network operators comprises one of:
   transmitting, as the indication of the two or more network operators, network operator identifiers corresponding to the two or more network operators, and determining the targeted network operator based on determining which one or ones of the transmitted network operator identifiers are included in the access request; and
   deriving an identity of the targeted network operator from an identity of the wireless device, as indicated by the wireless device in the access request.

5. The method of claim 1, wherein the transmitting the indication comprises transmitting a common network operator identifier for the two or more network operators.

6. The method of claim 5, wherein the determining the targeted network operator of the two or more network operators is based at least in part on receiving a wireless device identifier in the access request and determining a network operator affiliation of the wireless device from the wireless device identifier.

7. The method of claim 1, wherein the activating the cell further comprises:
conditionally activating the cell in dependence on communicating with a network entity associated with the targeted network operator, or associated with a roaming partner of the targeted network operator; and
receiving a return authorization from the network entity that indicates that cell activation is authorized for the wireless device.

8. The method of claim 1, further comprising, subsequent to the activation of the cell, admitting the wireless device into the cell based on recognizing the wireless device as having initially accessed the base station via the access channel.

9. The method of claim 8, further comprising disallowing admission of any additional wireless devices to the cell after the activation of the cell, unless such additional wireless devices first request access to the communication services via the access channel and are determined to be affiliated with the same targeted network operator for which the cell was activated.

10. The method of claim 1, further comprising:
selecting a particular spectrum in which to activate the cell autonomously; and
sending an indication to the targeted network operator of the activation.

11. The method of claim 1, further comprising:
receiving an indication from the targeted network operator, wherein the indication indicates a particular spectrum in which to activate the cell; and
activating the cell in the indicated spectrum.

12. A base station configured to perform dynamic cell activation, the base station comprising:
radio transceiver circuitry configured to communicate with wireless devices;
processing circuitry operatively associated with the radio transceiver circuitry;
memory containing instructions executable by the processing circuitry, whereby the base station is operative to:
transmit an indication of two or more network operators on an announcement channel;
receive an access request on an access channel associated with the announcement channel, wherein the access request is sent from a wireless device in response to receiving the announcement channel;
determine a targeted network operator of the two or more network operators from the access request; and
activate a cell in a selected spectrum that is associated with the targeted network operator, for providing communication services to the wireless device via the cell,
wherein the instructions are such that the base station is operative to activate the cell in the spectrum associated with the targeted network operator, as the selected spectrum, based on activating a radio communication cell at the base station, or initiating such activation by another base station, in accordance with predefined air interface protocols and network signaling protocols, as are used by the targeted network operator for operating an affiliated cellular communication network in the selected spectrum.

13. The base station of claim 12, wherein the instructions are such that the base station is operative to:

transmit the indication by transmitting signaling on a downlink announcement carrier; and
receive the access request on the access channel by receiving signaling on a corresponding uplink access carrier.

14. The base station of claim 13, wherein the instructions are such that the base station is operative to transmit the downlink announcement carrier and receive the uplink access carrier according to air interface protocols predefined for one or more types of wireless communication networks associated with the two or more network operators.

15. The base station of claim 12, wherein the instructions are such that the base station is operative to determine the targeted network operator of the two or more network operators by:
transmitting, as the indication of the two or more network operators, network operator identifiers corresponding to the two or more network operators, and determining the targeted network operator based on determining which one or ones of the transmitted network identifiers are included in the access request; or
deriving an identity of the targeted network operator from an identity of the wireless device, as included by the wireless device in the access request.

16. The base station of claim 12, wherein the instructions are such that the base station is operative to transmit the indication by transmitting a common network operator identifier for the two or more network operators.

17. The base station of claim 16, wherein the instructions are such that the base station is operative to determine the targeted network operator of the two or more network operators based at least in part on receiving a wireless device identifier in the access request and determining a network operator affiliation of the wireless device from the wireless device identifier.

18. The base station of claim 12, wherein the instructions are such that the base station is operative to activate the cell in the selected spectrum associated with the targeted network operator by:
conditionally activating the cell in dependence on communicating, via a network interface of the base station, with a network entity that is associated with the targeted network operator, or that is associated with a roaming partner of the targeted network operator; and
receiving a return authorization from the network entity that indicates that cell activation is authorized for the wireless device.

19. The base station of claim 12, wherein the instructions are such that the base station is further operative to, subsequent to the activation of the cell, admit the wireless device into the cell based on recognizing the wireless device as having initially accessed the base station via the access channel.

20. The base station of claim 19, wherein the instructions are such that the base station is further operative to disallow admission of any additional wireless devices to the cell after the activation of the cell, unless such additional wireless devices first request access to the communication services via the access channel and are determined by the base station to be affiliated with the same targeted network operator for which the cell was activated.

21. The base station of claim 12, wherein the instructions are such that the base station is further operative to:
select a particular spectrum in which to activate the cell autonomously; and send, via a network interface of the base station, an indication to the targeted network operator of the activation.

22. The base station of claim 12, wherein the instructions are such that the base station is further operative to:
receive, via a network interface of the base station, an indication from the targeted network operator, wherein the indication indicates a particular spectrum in which to activate the cell; and
activate the cell in the indicated spectrum.

23. A method, at a base station, of performing dynamic cell activation, the method comprising:
transmitting an indication of two or more network operators on an announcement channel;
receiving an access request on an access channel associated with the announcement channel, wherein the access request is sent from a wireless device in response to receiving the announcement channel;
determining a targeted network operator of the two or more network operators from the access request;
activating a cell in a selected spectrum that is associated with the targeted network operator, for providing communication services to the wireless device via the cell;
subsequent to the activation of the cell, admitting the wireless device into the cell based on recognizing the wireless device as having initially accessed the base station via the access channel; and
disallowing admission of any additional wireless devices to the cell after the activation of the cell, unless such additional wireless devices first request access to the communication services via the access channel and are determined to be affiliated with the same targeted network operator for which the cell was activated.

24. A base station configured to perform dynamic cell activation, the base station comprising:
radio transceiver circuitry configured to communicate with wireless devices;
processing circuitry operatively associated with the radio transceiver circuitry;
memory containing instructions executable by the processing circuitry, whereby the base station is operative to:
transmit an indication of two or more network operators on an announcement channel;
receive an access request on an access channel associated with the announcement channel, wherein the access request is sent from a wireless device in response to receiving the announcement channel;
determine a targeted network operator of the two or more network operators from the access request;
activate a cell in a selected spectrum that is associated with the targeted network operator, for providing communication services to the wireless device via the cell;
subsequent to the activation of the cell, admit the wireless device into the cell based on recognizing the wireless device as having initially accessed the base station via the access channel; and
disallow admission of any additional wireless devices to the cell after activation of the cell, unless such additional wireless devices first request access to the communication services via the access channel and are determined by the base station to be affiliated with the same targeted network operator for which the cell was activated.

* * * * *